United States Patent Office 2,734,926
Patented Feb. 14, 1956

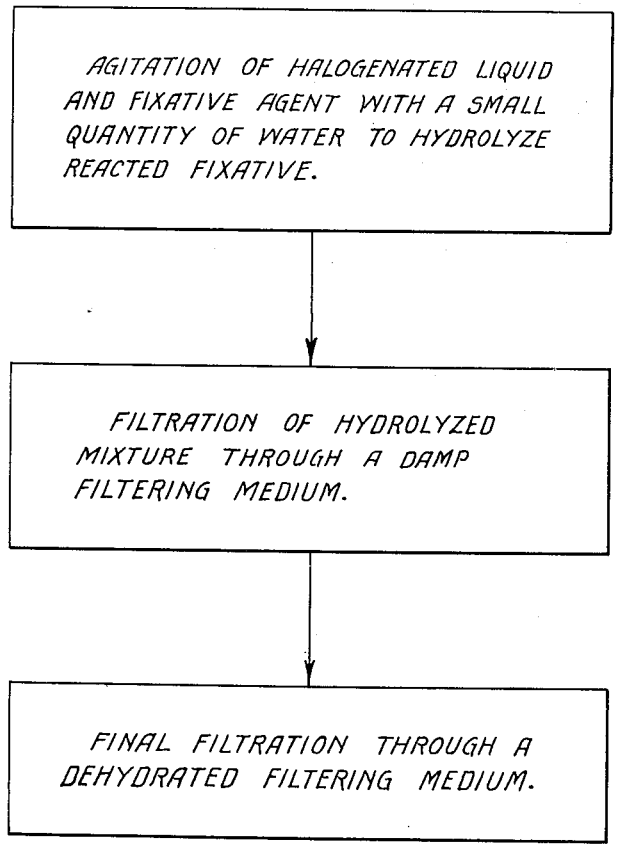
Inventors
Edward L. Raab,
Fred C. Gorsline,
by *Gilbert P Tarleton*
Their Attorney.

2,734,926
TREATMENT OF HALOGENATED INSULATING LIQUIDS

Edward L. Raab, Pittsfield, Mass., and Fred C. Gorsline, Philmont, N. Y., assignors to General Electric Company, a corporation of New York Application November 6, 1951, Serial No. 255,134

4 Claims. (Cl. 260—649)

The present invention comprises a process for the purification and reclamation of insulating and dielectric liquids which have become contaminated with a partially or loosely bound but still potentially chemically reactive halogen compound.

Our invention is applicable in particular to the reclamation of liquid halogenated aryl hydrocarbon insulating materials which contain a spent or partially spent reagent adapted to fix or bind minute amounts of free halide impurities, for example, hydrogen chloride.

Various compositions of this type are known. In United States Patent 2,453,493, Clark and Raab, dated November 9, 1948, are disclosed fixative materials respectively consisting of heterocyclic ring compounds, such as quinaldine, brucine, nicotine, and the like to be added to liquid halogenated compositions. In Patent 2,468,544, dated April 26, 1949, Clark, are disclosed fixatives consisting of metallo-organic compounds, such, for example, as tin tetraphenyl. These fixatives function to combine with contaminants containing or consisting of reactive halogen ions or hydrogen halides which may be disengaged from the liquid halogenated insulation by some abnormal occurrence, for example, an electric discharge. Ordinarily, the fixative agent is required to yield protection for only a relatively short time, that is, until repairs can be made and the halogenated fluid insulation can be replaced following such abnormal occurrence.

It is not advisable to start operation of a new or reconditioned apparatus containing halogenated hydrocarbon insulating liquids with even a small amount of halogen being held bound or fixed by the fixative contained therein. During long years of expected normal operation, the fixative-bound halogen may become chemically freed so as to be a potential source of damage to the apparatus.

It is an object of our invention to remove from halogenated liquid insulating and dielectric compositions such bound but potentially reactive halogen.

As will be now more fully explained, we have discovered that such source of possible contamination may be removed by a controlled treatment of the liquid insulating composition with water.

The drawing provides a flow diagram of one of the embodiments of this invention.

Our invention may be further explained by specific reference to insulating compositions described in United States Patent 1,931,455, Clark, patented October 17, 1933, consisting of chemically stable chlorinated aromatic hydrocarbons, for example, chlorinated diphenyl, chlorinated benzene and other compounds of this class or mixtures thereof. Prior to introduction of such compositions into electric devices, for example into electric transformers, it is customary to add a small amount of a chemical fixative with which chemically reactive contaminants of the halide type become bound if inadvertently introduced or liberated. The halogen components of stable, halogenated aromatic hydrocarbons do not react with components of electric apparatus but free halogen ions (e. g., Cl⁻, F⁻ derived from chloride or fluoride) and hydrogen halides cause trouble even if present in as minute proportion as 1.5 or 2 parts in ten million. The freeing of bound halogen from the fixing agent may occur accidentally as by hydrolysis due to the introduction of moisture through a leaky gasket or from the atmosphere during repair of the apparatus, or even by degradation thermally or otherwise of solid insulation present in the device.

It has been found that during shipment, storage and handling of such halogenated insulating materials, initial contamination sometimes occurs which makes it undesirable to introduce the degraded material into new apparatus. For example, during assembly and test of large transformers prior to shipment it is customary to drain from the transformers, before shipment to a customer, the initial charge of liquid chlorinated hydrocarbon which due to the halogen-reactive fixative contained therein may have picked up, for example, during assembly and test, some reactive halogen-containing impurities from elements of the apparatus, or from containers and pipe lines, or even from the atmosphere. An amount as small as a few parts per ten million of chloride ion material even though bound into relatively inactive condition by the fixative will make such material unacceptable for introduction into a transformer for regular long-continued operation.

Insulating compositions should be adapted to operate normally for years without undue deterioration. It has been found that with a prospect of such a protracted period of operation during which the halogenated hydrocarbons are in contact at elevated temperatures with cellulosic insulation of the apparatus, it is unwise to have present at the outset of the life of the apparatus even as much as 0.000015% of reactive or potentially reactive halide. The accepted maximum throughout the electrical industry is 0.000010%. To avoid the possibility of an expensive shutdown and necessary repairs it is customary to reject for use material having present even such minute amount of halogen ion component.

Heretofore purification of such rejected material by known processes have been unsuccessful. In Clark United States Patent 1,994,302 is described a process whereby the electrical resistivity of liquid halogenated hydrocarbons containing undetermined impurities may be increased by subjecting the product to contact with dry fuller's earth at an elevated temperature for lengthy periods. It has been found that this treatment is ineffective for removing halogen ion type of impurity which has reacted with the fixative agent even if the treatment is continued for a very long time. By such protracted filtration the unused active fixative, that is fixative which has not become bound with reactive halide, is gradually depleted from the liquid material being filtered. As fixative compositions are expensive this loss alone would make filtration through the usual dry filtering medium impracticable. Even if such filtration were ultimately effective the attendant expense and loss of time would alone preclude its practical use.

We have discovered that the following simple and inexpensive purification will free such halogenated material from bound halide ion components. The material to be treated if the amount of contaminant is as high as 0.15 part per million (p. p. m.) is brought into intimate contact with a relatively small amount of substantially pure water at ambient or room temperature by vigorous agitation or spraying. Free water, which separates by gravity after agitation, should ordinarily no more than cover as a thin film the gravity-settled halogenated hyrdocarbon. Free water (containing in solution whatever by-products may be formed by a reaction of water with halogenated impurities) if present in appreciable amounts is removed conveniently by decantation. By the term "free water"

is meant water which is visibly present as contrasted with water dispersed as invisible droplets or water in solution.

Continued and complete purification occurs by filtration of the halogenated liquid to be purified through damp filtering medium, such as fuller's earth, or dampened blotter paper in a filter press. Ordinary fuller's earth may be used which has not been subjected to customary predrying treatment. Such fuller's earth commonly contains about 8 to 15% of water even though the earth material may appear dry to touch. If a filter press containing absorbent paper is to be used, moisture may be introduced prior to filtration by moistening with water one absorbent paper sheet or pad out of each three or four dry paper pads contained in each frame of the filter press. The unwetted blotter sheets in each frame are assembled with the wetted sheet.

Only a relatively small amount of filtering medium need be used for this phase of the process, roughly about 10 to 30 lbs. of fuller's earth for treating 550 gallons of liquid halogenated material. This step completes the purification. In addition any remaining small amounts of water are removed by the filtration. The filtration step removes dispersed water, that is water suspended as minute droplets, and also water dissolved in the halogenated liquid.

Finally the purified halogenated insulating material may be more completely dried by filtration at ordinary temperature through a dehydrated filtering medium, such as anhydrous fuller's earth in which the moisture has been previously reduced to a negligible amount by drying at an elevated temperature. Other dehydrated sorbent filtering media may be used as for example, dried silica gel, dried alumina, bauxite or any of the dried or activated diatomaceous earth type materials.

Although we do not wish to be bound by a theoretical explanation of the mechanism of the purification we understand hydrolysis to occur, the reactive halogen material reacting with water as will be indicated.

Apparently halide material, as for example, hydrogen chloride (HCl) becomes associated with the fixative, such as tin tetraphenyl for example, by a reaction which may be exemplified as follows:

$$Sn(C_6H_5)_4 + 2HCl \rightarrow Sn(C_6H_5)_2Cl_2 + 2C_6H_6$$

By contact with water the following hydrolysis is believed to occur:

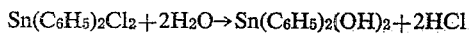
$$Sn(C_6H_5)_2Cl_2 + 2H_2O \rightarrow Sn(C_6H_5)_2(OH)_2 + 2HCl$$

Most of the tin tetraphenyl, or whatever other fixative, will be present in the composition in its original state, that is, not combined with halogen. As it is not affected by the chloride (or other halide) which is picked up by the composition such unused fixative remains unaffected by the treatment cited.

It is not always essential in the practice of our invention that halogenated compositions which have picked up an undesirable content of halogen ion or hydrogen halide should be agitated with free water. In many instances, such compositions can be purified solely by being conducted through a filtering medium which is associated with adsorbed water without being perceptibly wet. Compositions of chlorinated diphenyl or chlorinated benzene or mixtures of these compounds containing a fractional percent of organo-metallic fixative may have picked up enough hydrogen chloride or other halide to result in a total halogen content of perhaps 0.15 to 0.50 p. p. m. or higher. Such contaminated compositions may be purified by being conducted at room temperature through about 15 lbs. to 30 lbs. of ordinary undried fuller's earth in a filter press. Fuller's earth which has not been subjected to a drastic drying process contains approximately 10% water; that is, even though not perceptibly damp, fuller's earth, if exposed to ordinary atmospheric conditions before use, contains at least this amount of water.

Similarly, liquid insulating compositions containing but a small amount of bound, potentially-reactive halogen may be purified by being conducted through a filter press containing predominantly dried filter paper but containing a few sheets of filter paper, for example one out of four, which has been dampened sufficiently to provide enough moisture to set free the halogen which then is removed from the liquid insulating composition. It may be advisable to have either a predominant proportion or all of the paper of the filtering medium consist of paper containing about 10% of moisture. In some cases the liquid composition containing potentially-reactive halogen impurity may be conducted through a blotter press containing both undried fuller's earth and undried filter paper.

When during service in a transformer or the like an electric arc has occurred in contact with a liquid chlorinated hydrocarbon cooling liquid, some decomposition will result accompanied by dissociation of the hydrocarbon and considerable carbon and enough halogen ion material (such as hydrochloric acid) may be freed to result in the cooling liquid becoming contaminated with perhaps as much as 50 p. p. m. or more of chlorine contaminant. Special treatment is required to purify such highly contaminated material. It may be purified by a procedure such as described in Clark United States Patent 2,205,187, patented June 18, 1940, whereby an aqueous solution of copper sulfate or aluminum sulfate is dispersed in the halogenated liquid which contains dissociation products.

In order to completely free the liquid hydrocarbon from halide, it should be subjected subsequently to the herein described purification process before returning it for normal function in an electric device. It may also be necessary to add additional fixative to restore losses.

The removal of bound but potentially reactive halogen from insulating liquids as a consequence of our invention results in the operation of expensive electric apparatus, for example, large power transformers, with longer trouble-free useful lives and consequently economic savings. The further reclamation of contaminated liquids which formerly were scrapped as useless, the savings of labor and materials, and the savings in expensive fixative agents all result from the practice of our invention.

What we claim as new and desire to secure by Letters Patent of the United States is:

1. The method of treating liquid halogenated aromatic hydrocarbon material containing a fixative in hydrolyzable combination with a minute amount of reactive halogen impurity greater than the acceptable maximum of about one hundred thousandth percent, which method consists in bringing such contaminated material into contact with substantially pure water, the contact with water including the step of conducting said halogenated hydrocarbon material through a damp filtering medium containing so small an amount of water that the said halogenated hydrocarbon material is not appreciably increased in water content by such filtration, and finally filtering said halogenated hydrocarbon material through a dehydrated sorbent filtering medium to remove substantially all of the water therefrom.

2. The method of purifying a liquid chlorinated aromatic hydrocarbon material containing a fixative in hydrolyzable combination with a minute amount of reactive chlorine impurity sufficient to render the chlorinated hydrocarbon material unfit for normal use as electrical insulation material, which consists in treating said chlorinated hydrocarbon material by agitation of said chlorinated hydrocarbon material with substantially pure water, decanting whatever excess water is gravity-separable from said chlorinated hydrocarbon material, thereupon conducting said chlorinated hydrocarbon material at ordinary temperature through filtering medium containing appreciable water without being perceptibly wet, and finally filtering said chlorinated hydrocarbon material through a dehydrated sorbent filtering medium to remove substantially all of the water therefrom.

3. The method of purifying a liquid chlorinated aromatic hydrocarbon material containing a fixative in hydrolyzable combination with a minute amount of reactive halogen impurity sufficient to render the chlorinated hydrocarbon material unfit for normal use as electrical insulation material which consists in conducting said chlorinated hydrocarbon material through a filter medium consisting of a combination of fuller's earth containing about 8 to 15% of moisture and filter paper containing a similar amount of moisture, and filtering said chlorinated hydrocarbon material through a dehydrated sorbent filtering medium to remove substantially all of the water therefrom.

4. The method of claim 3 in which the fixative material is tin tetraphenyl.

References Cited in the file of this patent
UNITED STATES PATENTS

| | | |
|---|---|---|
| 1,947,709 | Garrison et al. | Feb. 20, 1934 |
| 1,994,302 | Clark | Mar. 12, 1935 |
| 2,069,790 | Wahlforss et al. | Feb. 9, 1937 |
| 2,205,187 | Clark | June 18, 1940 |
| 2,391,686 | McLean | Dec. 25, 1945 |
| 2,397,760 | Shmidl | Apr. 2, 1946 |
| 2,402,978 | Allen et al. | July 2, 1946 |
| 2,454,615 | Ridgway et al. | Nov. 23, 1948 |
| 2,538,723 | Fruhwirth et al. | Jan. 16, 1951 |
| 2,577,847 | Florio et al. | Dec. 11, 1951 |